Figure 1:
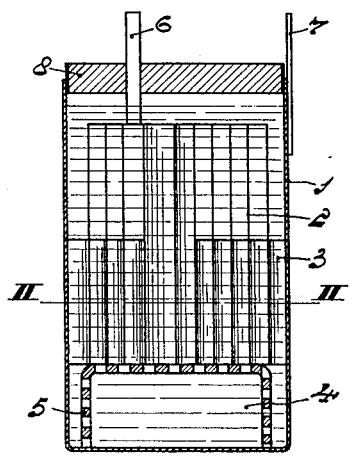

April 28, 1936.  W. C. VAN GEEL ET AL  2,038,616

ELECTRODE SYSTEM

Filed June 14, 1932

INVENTOR
WILLEM CHRISTAAN VAN GEEL
JAN HENDRIK DE BOER
BY
ATTORNEY

Patented Apr. 28, 1936

2,038,616

UNITED STATES PATENT OFFICE 2,038,616

ELECTRODE SYSTEM

Willem Christiaan van Geel and Jan Hendrik de Boer, Eindhoven, Netherlands, assignors to Radio Corporation of America, a corporation of Delaware Application June 14, 1932, Serial No. 617,174
In Germany June 26, 1931

2 Claims. (Cl. 175—315)

The present invention relates to an electrode system in which at least one of the electrodes consists at least partly of one of the metals of the first sub group of the fourth principal group of the periodic system of the elements whereas the other electrode together with a supply conductor is constituted by an electrolytically conducting substance. Such electrode systems are inter alia used as condensers.

The metals of the first sub group of the fourth principal group have proved to be particularly adapted for this purpose which is evidently due to the great uniformity and stability of the oxide layer formed on the electrodes and serving as an intermediate layer, by which the current is blocked in one direction. Owing to the proper nature of the oxide layer it may be rendered very thin without losing the blocking properties. Due to this extremely thin layer it is possible, for instance, to establish a condenser having a very large capacity per unit of area.

It has been found that the manufacture of such electrode systems for high tensions is attended with difficulties when using the usual electrolytically conducting materials. When exceeding the admissible tension which has often a value between 150 and 250 volts, the oxide layer assumes a grey colour, while the current in the blocking direction increases, so that the system becomes unsuitable for practical purposes. Only as long as the tension remains below 100 volts is it possible to keep this current small, for instance, below 0.01 ma.

When using other metals not belonging to the first sub group of the fourth principal group, for instance, aluminium, it has already been suggested to dissolve the electrolyte in an alcohol for instance, glycerin and aluminium condensers, for instance, of this type are already known. For this purpose alcohols were used containing a certain percentage of water.

However, it has been found, that solutions in such alcohols are not adapted without additional means also for the metals of the first sub group of the fourth principal group, since also in this case the current passing in the blocking direction highly increases for high tensions.

By "electrolyte" is to be understood in the present case a material which in a suitable solution conducts the current electrolytically.

According to the invention the above difficulties are avoided by using a solution of an electrolyte, in particular in an alcohol, for instance, glycerin, which is entirely free from water.

When using such a solution it is possible to construct an electrode system by which the current is blocked in one direction even at tensions of 600 volts and higher and which has a very long life. In addition the oxide layer can be kept very thin so that it is possible to obtain a condenser having a large capacity and in which a very weak current passes in the blocking direction.

Figure 2:
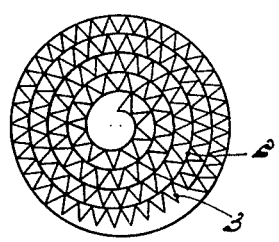

An electrolytic condenser incorporating the features of the invention is shown, by way of example, in the drawing wherein Fig. 1 illustrates diagrammatically a section through a preferred embodiment of the invention and Fig. 2 is an end view of the device shown in Fig. 1 along the lines II—II. In said figure, I is a copper vessel within which is arranged an electrode 2 consisting of a zirconium band which is rolled up and whose successive windings are properly spaced apart by profiled celluloid bands 3, said vessel being filled with a solution 4 consisting of glycerin and primary potassium phosphate ($KH_2PO_4$) [50 gr. of electrolyte ($KH_2PO_4$) to the litre of solvent (glycerin)]. The electrode 2 and the spacing bands 3 are supported on a base 5 which is suitably placed in the bottom of the container I. The base 5 acts to insulate the electrode 2 from the container I. It should be noted that the support 5 is provided with suitable apertures in order to permit the electrolyte solution to circulate freely. A cover 8 is provided to seal the electrolyte within the container. The two terminals 6 and 7 provide the necessary external connections for the condenser.

The zirconium forms one of the electrodes whereas the solution together with the vessel wall consisting of copper constitutes the other electrode. Such a condenser may be used for smoothing direct current. At a tension of 500 volts set up between the electrodes the current passing in the blocking direction is 0.02 ma. per microfarad.

Another suitable combination is glycerin and anhydrous phosphoric acid. It is also possible to use glycerin together with alum and citric acid, but in this case the solution must first of all be boiled for some time, so as to remove the water (crystal water of the alum). Specific examples of the alum used are as follows:

$$K_2SO_4.Al_2(SO_4)_3.24H_2O,$$

or else $$KAl(SO_4)_2.12H_2O.$$

At any rate care must be taken that no water is present in the solution.

A condenser of the type referred to may also be used for alternating current when placing two electrodes (coated with an oxide layer) consisting of zirconium, titanium, hafnium or thorium in the electrolyte solution and if each of them be connected with one pole.

If the oxidation is effected before the electrode system is put into service as a condenser or a rectifier, it is not always necessary that the oxidation occurs in the electrolyte solution in which the electrodes are eventually arranged.

The metals may be oxidized in solutions of phosphoric acid in glycerin or of caustic alkali or potash in ethyl alcohol, and in this case less attention need be paid to the complete freedom of water. As a rule the oxidation is effected at temperatures near 100° C., for instance, in glycerin at 150° C. and in ethyl alcohol at 78° C.

What we claim is:

1. An electrolytic cell comprising a copper vessel acting as one electrode of the cell, a second electrode for the cell comprising a zirconium band rolled up and arranged so that the successive windings thereof are spaced, said second electrode being immersed within the copper vessel in a solution consisting of glycerin and primary potassium phosphate in the approximate proportion of fifty grains of potassium phosphate to the liter of glycerin.

2. An electrolytic condenser comprising a copper vessel acting as one electrode thereof, a second electrode for the condenser consisting of a spirally wound zirconium band provided with means interposed between the successive windings so as to space the adjacent windings, said zirconium band being inserted within said vessel, means for insulatingly supporting the band within the vessel, said vessel being filled with a solution including glycerin and primary potassium phosphate in the approximate proportion of fifty grains of potassium phosphate to the liter of glycerin.

WILLEM CHRISTIAN van GEEL.
JAN HENDRIK de BOER.